United States Patent [19]

Frasch

[11] Patent Number: 4,591,087
[45] Date of Patent: May 27, 1986

[54] APPARATUS FOR MAKING ROLLING SPOT BONDS

[75] Inventor: Eugene W. Frasch, Warminster, Pa.

[73] Assignee: Kulicke and Soffa Industries Inc., Horsham, Pa.

[21] Appl. No.: 587,225

[22] Filed: Mar. 7, 1984

[51] Int. Cl.[4] .............................................. B23K 1/06
[52] U.S. Cl. ................................... 228/110; 228/1.1; 156/580.2
[58] Field of Search .............................. 228/1.1, 110; 156/580.1, 580.2

[56] References Cited

U.S. PATENT DOCUMENTS

| | | | |
|---|---|---|---|
| 3,505,726 | 4/1970 | Kleinedler et al. | 228/110 |
| 3,575,333 | 4/1971 | Kulicke, Jr. | 228/1.1 |
| 3,585,096 | 5/1969 | Uhimchuk et al. | 228/1.1 |
| 3,593,906 | 7/1971 | Hug | 228/1.1 |
| 3,601,304 | 8/1971 | Mansour | 228/1.1 |
| 3,863,826 | 2/1975 | Shoh | 228/1.1 |
| 3,954,217 | 5/1976 | Smith | 228/1.1 |
| 4,071,180 | 1/1978 | Dupuis | 228/1.1 |
| 4,438,880 | 3/1984 | Smith et al. | 228/110 |

Primary Examiner—Nicholas P. Godici
Assistant Examiner—Samuel M. Heinrich
Attorney, Agent, or Firm—John B. Sowell

[57] ABSTRACT

An ultrasonic transducer is provided with a wedge bonding tool having an arcuate convex working face. The wedge bonding tool is engaged on top of a foil finger of a connector to be spot bonded to a terminal or pad on a device or substrate. As force and ultrasonic power are applied to the bonding wedge it is rocked or pivoted about a pivot point on the working face of the wedge bonding tool to produce a rolling spot bond between the foil finger and the terminal or pad.

14 Claims, 9 Drawing Figures

APPARATUS FOR MAKING ROLLING SPOT BONDS

BACKGROUND OF THE INVENTION

1. Field of the Invention

The present invention relates to ultrasonic spot bonding. More particularly, the present invention relates to a new and improved edge bonding apparatus for making rolling spot bonds between conductive fingers and pads on a substrate of a semiconductor or solar cell.

2. Description of the Prior Art

The pads and electrodes on semiconductor chips are usually wire bonded to make conductive interconnections between the pads on the chip and the conductive lead-out patterns which connect to the pins inside a semiconductor package such as a dual in-line package or DIP. The pads and electrodes are so close together on tightly packed integrated circuits that the wires also provide a means for spreading or fanning out the conductors so that the connection pins on the packages of the integrated circuits are reasonably spaced.

It is known that very small etched foil patterns comprising a plurality of conductive fingers can be individually ultrasonically bonded or thermocompression gang bonded to pads and electrodes on semiconductor chips if specially prepared bumps are plated on either the pads or the conductive fingers. Since the foil pattern or fingers are usually made on a dielectric supporting tape this technique and variations of this technique are known as tape automated bonding or TAB. The bonding tool employed to make bonds between the foil fingers and the special pads or bumps may be shaped to bond all of the fingers simultaneously or to bond one or more of the fingers at one time. The bonding tool is referred to as a wedge or tab bonding tool and is not usually employed to mash the fingers being bonded in the same manner that a wire bond is mashed when a wire is bonded at the second or last bond.

Heretofore, ribbons of thin flat strips of conductive metal have been employed in the semiconductor industry to make interconnections. When such ribbons are ultrasonically bonded to a semiconductor device or device substrate, the ribbon is mashed by the wedge bonding tool to make a proper molecular interconnection between a terminal or pad and the ribbon. Such ribbons have been bonded by vertically moving wedges and by horizontally rolling wheel shaped ultrasonic transducers.

When the manufacturers of solar cells were faced with the problem of making solar cells economically, all of the abovementioned methods of making thermocompression and ultrasonic bond interconnections were considered as well as solder reflow techniques. While solder reflow and roller seam welding were deemed to produce feasible bonds in the laboratory they were either too costly or did not produce commercially usable products. Solder reflow is slower, requires flux and special cleaning before and after bonding as well as expensively prepared foil for making interconnections.

Roller seam welding entails the use of large powerful generators and transducers which cannot easily be tuned to optimum values. In addition to being slow and expensive the large mass of the roller seam welder does not lend itself to making consistent spot or seam bonds on small conductive fingers. Since solar cells are made on thin silicon substrates and are very brittle, the high bonding forces which are required to make roller seam bonds tends to crack the substrate and/or crash onto the cell material of the solar cell on either side of the finger which can crack the substrate or damage the substrate material. A solar cell may have eight to twelve dendritic web patterns and associated pads for collecting electrons. Each of the patterns will require that a finger be bonded on the front pads and the back of the web pattern. Up to 180 cells are employed in one panel or module, thus, about 3000 bonds per panel or module are usually employed in a commercially usable 60 watt module. If any two bonds are bad on any one cell or if the cell is broken and unusable the module must be repaired before it can be accepted. It would be desirable to provide an apparatus and a method for bonding thin strips, fingers or ribbons to the front and/or back of solar cells so that they may be connected in series and parallel arrays in modules that are to be manufactured economically without having to rework and repair the solar cells.

SUMMARY OF THE INVENTION

It is a primary object of the present invention to provide a novel low mass, high speed rolling spot wedge bonding apparatus.

It is another primary object of the present invention to provide a rolling spot bonding apparatus which permits the wedge bonding system to be optimized to the mid-range of the power of the ultrasonic generator.

It is another primary object of the present invention to provide a bonding apparatus which employs interchangable rolling wedge bonding tools which are matched to the optimum power and force parameters of the bonding system.

It is another object of the present invention to provide means for changing the bonding force per unit area on the working face of the bonding tool.

It is another object of the present invention to provide means for progressively making an ultrasonic spot bond with a wedge bonding tool.

It is another object of the present invention to provide means for producing high unit bonding forces employing low total bonding forces.

It is a general object of the present invention to provide a novel bonding apparatus for effectively bonding thin foil fingers of conductive patterns to pads on a fragile substrate device at high speed without breaking the substrate.

According to these and other objects of the present invention fingers of a conductive pattern are ultrasonically bonded to a pad on a substrate by providing an arcuate convex working face on a wedge bonding tool. A transducer employed to hold the wedge bonding tool is mounted on a transducer supporting apparatus so that the convex working face of the wedge bonding tool is effectively pivoted on a pivot point on the working face of the wedge bonding tool to provide a rolling wedge spot bond between the conductive fingers and the pads on the substrate.

DESCRIPTION OF THE PREFERRED EMBODIMENT

Figure 1:
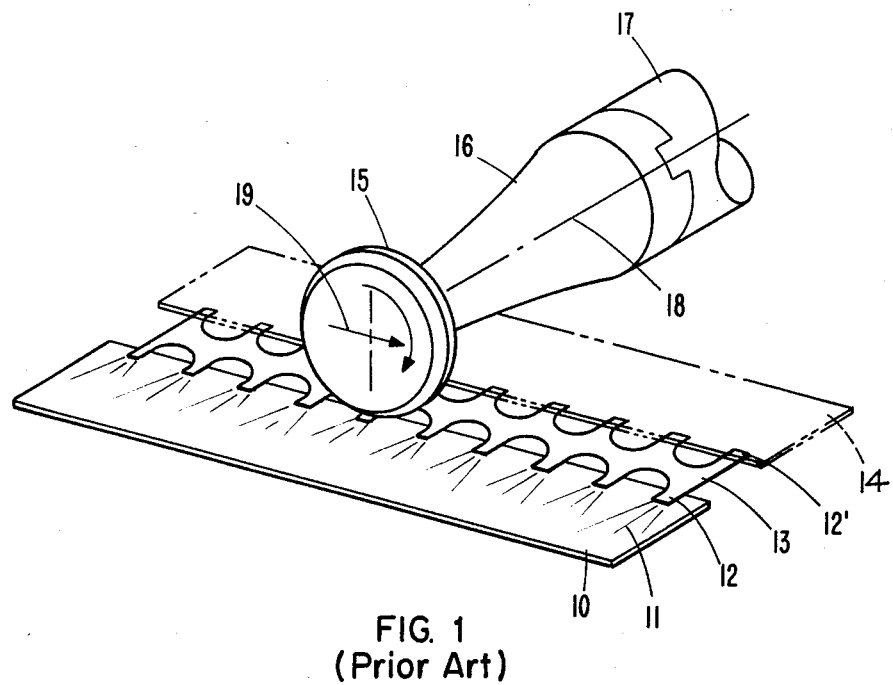
FIG. 1 is an isometric view of a prior art high mass seam welder employing a roller made intregrally with the horn of an ultrasonic transducer which is shown seam welding a foil connector strip to a solar cell substrate.

Refer now to FIG. 1 showing a solar cell 10 having ten individual fan shaped patterns 11. The lines of the pattern 11 are conductors adapted to collect free elections knocked loose by the protons in sunlight. The electrons are conducted to a pad or terminal (not shown) which is under the foil fingers 12 of the preformed aluminum ribbon 13. The foil fingers 12 are connected in parallel to a plurality of pads or terminals on the front face of substrate 10. The foil fingers 12' of ribbon 13 are connected to a conductive ground plane on the back of substrate 14 shown in phantom lines. The transducer shown in FIG. 1 is not employed to make the connections of the foil fingers 12' to the rear surface of substrate 14. In the preferred method of making an array where the solar cells 10 and 14 are connected in series, solar cell 10 is turned over and the foil fingers like foil fingers 12' are connected to a cell 14 by employing a transducer similar to that shown in FIG. 1. Transducer wheel 15 is made as an integral part of the transducer horn 16 which is connected to ultrasonic transducer body 17. In order to seam weld the foil fingers 12 it is necessary to rotate wheel 15, transducer horn 16 and transducer body 17 about the longitudinal axis 18 of the transducer. Thus, the transducer must be rotated and the rolling motion causes the center of wheel 15 to move along a linear translation axis 19.

Figure 2:
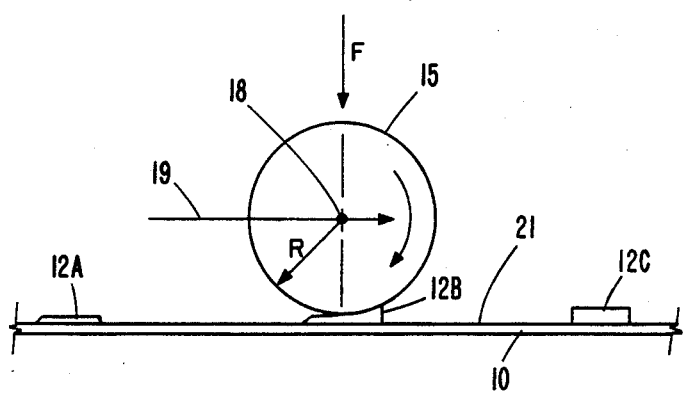
FIG. 2 is an enlarged front elevation of the structure shown in FIG. 1 showing the path of the roller when welding a foil connector finger to the substrate.

Refer now to FIG. 2 showing foil fingers 12A, 12B and 12C. The wheel 15 on transducer horn 16 is rotating about its longitudinal axis 18 while a force F is being applied simultaneously with ultrasonic power to produce a seam well on foil finger 12B. It will be noted that the radius R is fixed for each transducer horn 16 and if a different radius wheel is required, a new horn 16 and new wheel must be placed on the transducer body 17. Since the wheel 15 fixed on transducer horn 16 has a very high mass relative to the mass of the transducer body 17, the whole transducer system must be retuned to produce optimum coupling of the power from the transducer to the working face of the wheel 15. Since the wheel 15 is effectively rolled about axis 18 the radius of the working face of the wheel can not be changed without changing both the wheel and the transducer horn 16. The force F required to seam weld the foil fingers 12 to the substrate 10 is in the order of five to six hundred grams which causes the wheel 15 to crash into the upper surface 21 of substrate 10 when the wheel 15 moves past the end or side of substrate 12B. In high speed seam welding it is difficult to judge the time when the force F on wheel 15 is terminated and the wheel should be raised to avoid crashing into the substrate 10. Similarly, it is difficult to time the exact period when the working face of the wheel 15 will arrive at the next foil finger 12C to be bonded. Thus, not only does the wheel 15 crash into the substrate 10 but it also crashes into the unbonded fingers like 12C. The large mass associated with a seam welder of the type shown in FIGS. 1 and 2 has created problems which prevents a consistent and uniform bond from being made between the foil fingers 12 and the substrate 10, tends to crack the substrate 10, and/or causes the wheel 15 to engage the active surface 21 of the substrate 10 so as to destroy a part of the solar cell.

Figure 3:
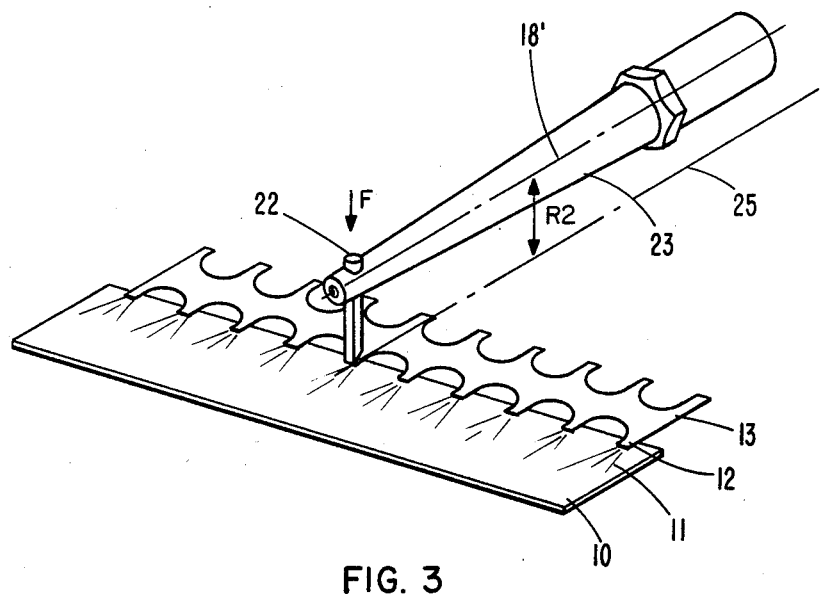
FIG. 3 is a isometric view of the present invention low mass transducer and removable wedge bonding tool employed to produce rolling wedge spot bonds.
Figure 4:
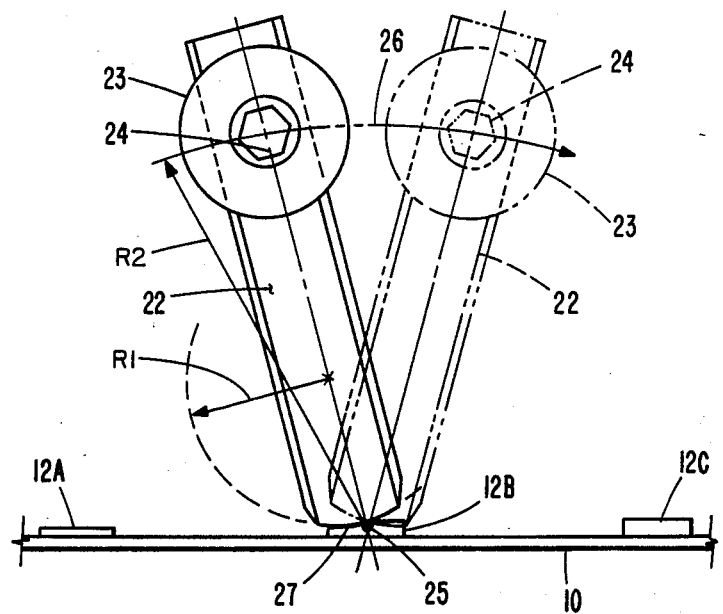
FIG. 4 is an enlarged front elevation of the low mass transducer and wedge bonding structure of FIG. 3 wherein the rolling wedge is spot bonding a foil connector finger to a substrate.

Refer now to FIGS. 3 and 4 showing a preferred embodiment of the present invention. The same substrate 10 is provided with patterns 11 on the silicon solar cell 10. The pads (not shown) under foil fingers 12 on preformed aluminum ribbon 13 are shown being bonded by a rolling wedge bonding tool 22 which is mounted in an ultrasonic transducer 23 by an attachment screw 24 in the end of the transducer 23.

As clearly shown in FIG. 4 the bonding tool 22 is pivoted on a pivot point 25 on the working face of the bonding tool 22. The working face of the bonding tool 22 is shown having a convex surface which is preferably a segment of a surface of a cylinder having a radius R1. The transducer 23 is moved through an arcuate path 26 which has a radius R2. The center of the radius R2 or focal point of the arcuate path 26 is the pivot point 25 on the working face of the novel rolling wedge bonding tool 22.

It will be understood that wedge bonding tools of the type used in the prior art had substantially flat working faces and had been successfully employed to bond small fingers and ribbons to substrates. Such prior art wedge bonding tools would tend to gouge holes in large fingers or ribbons 12A, 12B, or 12C similar to those shown in FIG. 4. When the working face 27 of the wedge bonding tool 22 is made larger than the width of the foil finger 12B it is possible to bring the rolling wedge bonding tool 22 down on the top edge of finger 12B and rotate the bonding tool 22 to the phantom position shown in FIG. 4 before lifting the bonding tool and transferring it to a new bonding position over the foil finger 12C. While rolling wedge bonding tool 22 is performing the desirable rolling spot bond it is not being translated along a linear translation axis 19 as shown in FIG. 2 which could cause the tool 22 to fall off of the foil finger 12B and crash into the substrate 10. Since the working face 27 of the bonding tool 22 may be made to any desired radius R1, the radius may be made small and the pressure per unit area of the working face 27 of the bonding tool is substantially increased without having to increase the bonding force F or to retune the system.

Figure 5:
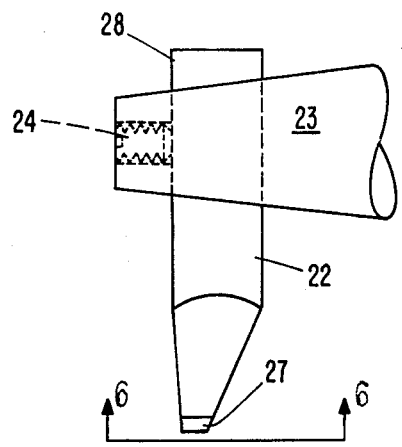
FIG. 5 is an enlarged side elevation of the low mass transducer and wedge bonding tool shown in FIGS. 3 and 4.
Figure 6:
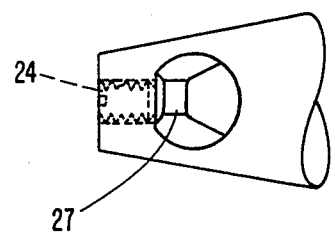
FIG. 6 is a section taken at lines 6—6 of FIG. 5 showing the working face of a preferred embodiment wedge bonding tool shown in FIGS. 3 to 5.

Refer now to FIG. 5 showing an enlarged side elevation of the low mass wedge bonding tool. The wedge bonding tool 22 is preferably made with a flat surface 28 on the front of a round carbide wedge 22. The convex arcuate working face 27 is made as a segment of a cylinder having a radius R1 by grinding the free end of the carbide tool on four tapered surfaces which define the working face 27. The wedge bonding tool 22 is held in transducer 23 by a screw 24 or by other well known means. In the preferred embodiment rolling wedge bonding tool 22 the working face 27 is made larger than the foil fingers 12 so that the edges of the working face will extend over the edges of the foil fingers when making a rolling spot bond and the pivot point 25 is centered in the center of the foil fingers 12. Also it is preferred that the radius R1 shown in FIG. 4, is smaller than the radius R2. When it is desired to change the unit force on a foil finger which may be of different material or being bonding to a different substrate it is only necessary to change the novel wedge bonding tool 22 and maintain the radius R2 constant while changing the radius R1 so as to provide an optimum unit force on the fingers 12.

One of the features of the present invention is that the working face of the bonding tool 22 can be made so small that the force F can be reduced substantially which enables the transducer 23 to be lifted vertically and moved laterally quickly and easily. In the preferred embodiment of the present invention the bonding tool 22 is restored to its original position 22 when lifted from a foil finger 12B and translated to its new bonding position over the foil finger 12C.

Figure 7:
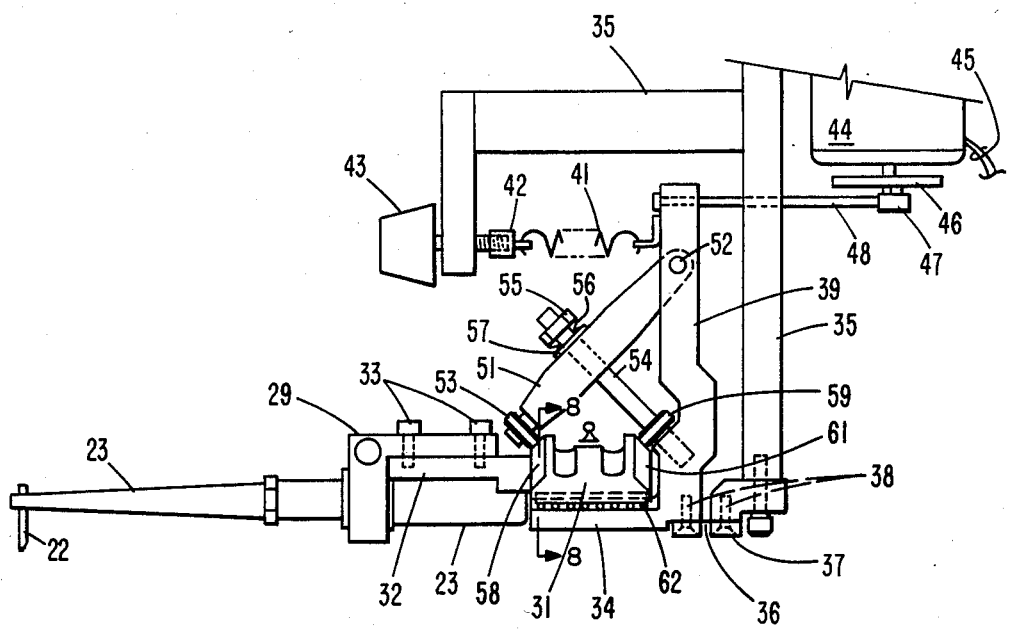
FIG. 7 is a side elevation of a preferred embodiment mounting means and force system for the transducer and wedge bonding tool shown in FIG. 3.

Refer now to FIG. 7 showing a side elevation of a preferred embodiment mounting means and force system. Rolling wedge bonding tool 22 is shown mounted in transducer 23. The transducer 23 is supported by transducer clamp 29. An outer race 31 having an extension 32 thereon is connected to transducer clamp 29 by screws 33. An inner race 34 is shown supported on bonding machine frame 35 by means of a leaf spring 36. The leaf spring 36 is held by strips 37 and screws 38 so as to provide a pivot point therebetween. A vertically extending actuating arm 39 is connected to the inner race 34 and provides means for moving the wedge bonding tool 22 vertically.

Bonding tool force means are provided by a tension spring 41 connected to the end of the actuating arm 39 and to a swivel 42 mounted on the threaded end of a force control knob 43. The actuating arm 39 is free to be moved by the tension spring 41 only when the bonding tool 22 is actually on a foil finger 12. Means for lifting the transducer 23 and wedge bonding tool 22 are shown schematically comprising a servo motor 44 mounted on frame 35. The servo motor 44 is connected by electrical leads 45 to a controller having a microprocessor therein. The shaft of motor 44 is connected to a disk 46 having a stub shaft or crank arm 47 thereon. The crank arm is connected to a control rod 48 which pulls on the upper end of actuating arm 39 to lift the bonding tool 22 and/or to lower the bonding tool 22 when it is in a position over a foil finger 12 to be roller spot bonded. Control rod 48 is loosely connected through actuating arm 39 so as to form a separable connection therewith. It will be understood that this structure is schematic and can be replaced by cams which cooperate directly with the actuating arm 39 so as to provide means for raising and lowering the bonding tool 22.

Roller arm 51 is pivotably mounted on actuating arm 39 at pivot 52. A roller 53 is rotatably mounted on the opposite end of arm 51. A roller shaft 54 is loosely connected to the actuating arm 39 and extends through a slot (not shown) in the roller arm 51. Nut 55, spring 56 and washer 57 provide means for urging roller 53 into engagement with an outer cam surface 58 on outer race 31. A roller 59 on roller shaft 54 engages a similar cam surface 61 on outer race 31. The combination of rollers 53 and 59 act as cam followers on surfaces 58 and 61 to urge the outer race 31 into engagement with the inner race 34 which is separated therefrom by bearing 62.

Figure 8:
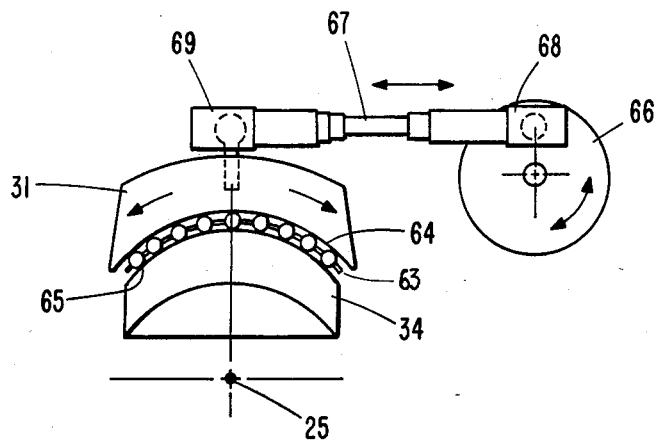
FIG. 8 is a section in elevation taken at lines 8—8 of FIG. 7 showing the roller bearings and races of the transducer mounting means.

Refer now to FIG. 8 which is a section in elevation taken at lines 8—8 of FIG. 7 showing the inner and outer race in cross section. Bearings 62 are shown held in place by a bearing cage 63 which separates the segmental cylindrical surface 64 of the outer race from the segmental cylindrical surface 65 of the inner race 34. As explained hereinbefore with reference to FIG. 7, the inner race 34 and outer race 31 are being resiliently urged in engagement with each other by the rollers 53 and 59 acting on cam surfaces 58 and 61. The pivoting motion which is imparted to the wedge bonding tool 22 as shown in FIG. 4 is supplied by the drive means shown in FIG. 8. Disk 66 acts as a crank arm and is connected to drive rod 67 by a ball and socket 68 connected between drive rod 67 and disk 66. A similar ball and socket 69 is connected to the driven end of drive rod 67 and connects the drive rod 67 to the outer race 31. It will be understood that the disk or crank arm 66 is driven by a servo motor under computer control so as to impart the desired arcuate motion to the transducer 23 which imparts the desired pivoting motion to the wedge bonding tool 22.

Figure 9:
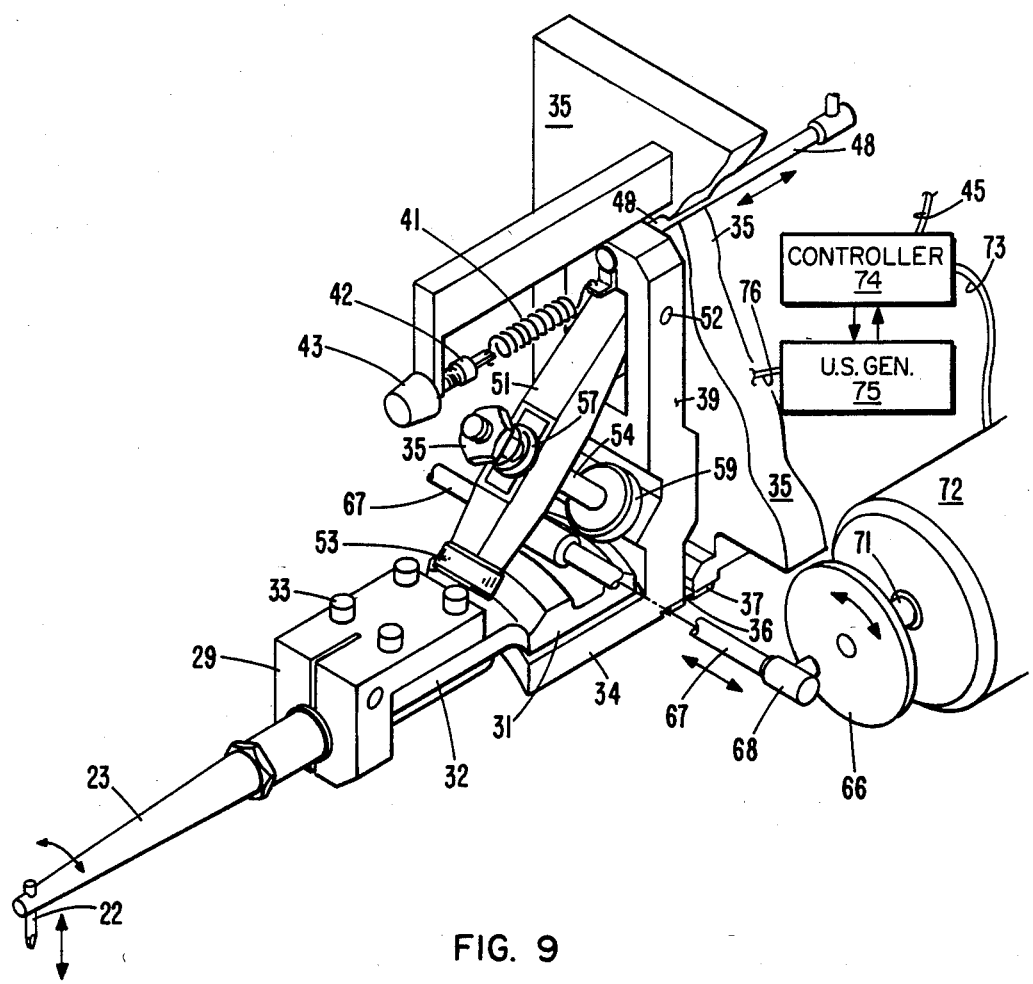
FIG. 9 is an isometric view of a preferred embodiment rolling wedge spot bonder and the motor drives for raising and lowering the bonding wedge and for imparting the preferred embodiment arcuate motion to the transducer.

Refer now to FIG. 9 which is a schematic isometric view of a preferred embodiment wedge spot bonder showing the motor drive for raising and lowering the bonding wedge and for imparting the desired arcuate motion to the transducer 23. The crank arm or disk 66 is shown connected by a shaft 71 to servo motor 72. Servo motor 72 is connected by control line 73 to microprocessor controller 74. The electrical lines 45 from microprocessor controller 74 also controls servo motor 44 shown in FIG. 7. Microprocessor controller 74 is shown coupled to ultrasonic generator 75 which is provided with lead 76 which connects to the transducer 23. Drive rod 67 which is connected to crank 66 by ball and socket 68 is shown extending completely past the upper race 31. It will be understood that a similar transducer like transducer 23 may be mounted on frame 35 in an identical manner to that shown in FIGS. 7 and 9 and driven in tandom and unison with the transducers shown in FIGS. 7 and 9. Thus, a pair of transducers 23 may be positioned over the foil fingers of a preformed connector strip or ribbon 13 and separated from each other by a space equal to half the length of a connector strip. Thus, the first transducer would be capable of independently being adjusted for bonding forces and optimum power so as to bond the first half of the foil fingers while the adjacent transducer was bonding the second half of the foil fingers on the connector strip 13. The same servo motor 44 employed to impart lifting motion to the wedge bonding tools 22 is capable of driving a pair of actuating arms 39 so that two or more transducers may be operated in unison. The same numbers employed on the elements in FIGS. 7 and 8 have been employed on the elements in FIG. 9 and these elements are identical and operate in the same manner as explained hereinbefore.

Having explained a preferred embodiment of the present invention it will be understood that the novel rolling wedge spot bonding tool 32 requires a new motion so as to pivot the bonding tool 22 on a pivot point 25 on the working face of the bonding tool. The preferred embodiment system for imparting this motion has been shown as a segment of an inner race and an outer race which forms the means for supporting and imparting motion to the transducer 23. It will be appreciated that employing only a segment of a full inner race and outer race leaves the space under the transducer system completely free for transfer mechanisms which may be employed to move the solar cell substrates 10. When the novel rolling wedge bonding system is employed to perform rolling wedge spot bonds on the foil fingers of tape automated bonding patterns such as those used for the inner leads on very large scale integrated circuits, the inner race and outer race may comprise a full annular or cylindrical inner and outer race. In fact, a pair of roller bearings such as Timken bearings may be substituted for the inner race 34 and the outer race 31 shown in FIG. 7 without departing from the mode of operation explained hereinbefore. However, the substitution of complete cylindrical bearings causes the bearings and support mechanism to become more massive and extend well below the pivot axis 25 shown in FIGS. 3, 7 and 9.

While the preferred embodiment of the present invention has been explained with reference to connecting foil fingers of a strip to solar cells, the present invention is also applicable to bonding foil fingers of foil patterns to integrated circuits especially when the foil patterns are employed with very large scale integrated circuits. Such circuits may have as many as fifty connection points on each side of a chip. The present invention ultrasonic rolling wedge spot bonding technique is fast, produces high yields and is economical. The present invention system is cheaper than seam welding systems, faster than seam welding systems, and more reliable than seam welding systems. Bonding forces have been reduced by at least one-half and the speed of bonding a plurality of foil fingers has been increased by at least one hundred percent while employing much smaller power generators and lighter mass transducers. The present invention is a primary factor in reducing the cost of producing solar panels to a cost per watt factor which permits them to be competitive with other forms of electrical power.

I claim:

1. Apparatus for ultrasonically spot bonding conductive fingers of a preformed connector to a substrate device, comprising:
   a bonding machine frame,
   a work station on said frame,
   said substrate device having a plurality of terminal connection pads thereon mounted on said work station,
   said preformed connector having a plurality of said conductive fingers positioned juxtaposed said terminal connection pads for being bonded thereto,
   an ultrasonic transducer having a longitudinal axis,
   means for mounting said ultrasonic transducer on said frame to provide arcuate pivotal movement transverse to said longitudinal axis of said transducer having an inner race and an outer race with bearings between said races,
   outer cam surfaces on said outer race,
   cam follower means engaging said outer cam surfaces,
   said cam follower means being coupled to said inner race and exerting a clamping force on said bearings,
   a wedge bonding tool mounted in said ultrasonic transducer,
   a convex shaped working face on the free end of said wedge bonding tool formed as a segment of a cylinder,
   a pivot point on said convex shaped working face of said wedge bonding tool,
   means for engaging said working face of said wedge bonding tool with one of said conductive fingers to be bonded to said substrate device, and
   means for moving the longitudinal axis of said ultrasonic transducer through an arcuate path to pivot said wedge bonding tool on its said pivot point and to provide a rolling spot bond of said conductive fingers to said substrate device.

2. Apparatus for ultrasonically spot bonding as set forth in claim 1 wherein said inner race and said outer race are cylindrical in shape.

3. Apparatus for ultrasonically spot bonding as set forth in claim 2 wherein said inner race and said outer race comprise segments of cylinders having different radius of curvature and the same pivot axis.

4. Apparatus for ultrasonically spot bonding as set forth in claim 4 wherein said inner race and said outer race have the same pivot axis and said pivot axis is parallel to said longitudinal axis of said ultrasonic transducer.

5. Apparatus for ultrasonically spot bonding as set forth in claim 1 wherein the radius R1 of the working face of said bonding tool is smaller than the radius R2 defined by the distance from said pivot point on said working face of said wedge bonding tool to said longitudinal axis of said ultrasonic transducer.

6. Apparatus for ultrasonically spot bonding as set forth in claim 1 wherein said means for mounting said ultrasonic transducer on said frame further comprises means for pivotally mounting said inner race on said frame.

7. Apparatus for ultrasonically spot bonding as set forth in claim 6 which further includes an actuating arm connected to said inner race.

8. Apparatus for ultrasonically spot bonding as set forth in claim 7 which further includes means for applying a bonding force to said actuating arm comprising a tension spring and means for adjusting the tension in said tension spring.

9. Apparatus for ultrasonically spot bonding as set forth in claim 7 which further includes transducer drive means coupled to said actuating arm for raising and lowering said ultrasonic transducer and said wedge bonding tool.

10. Apparatus for ultrasonically spot bonding as set forth in claim 7 which further includes drive means coupled to said outer race for imparting said arcuate pivotal movement to said longitudinal axis of said ultrasonic transducer.

11. Apparatus for ultrasonically spot bonding as set forth in claim 1 which further includes,
   control means, and
   means for imparting a bonding force to said wedge bonding tool controlled by said control means.

12. Apparatus for ultrasonically spot bonding as set forth in claim 11 which further includes means for imparting arcuate pivotal movement to said longitudinal axis controlled by said control means.

13. Apparatus for ultrasonically spot bonding as set forth in claim 1 which further includes an actuating arm connected to said inner race, and said cam follower means being pivotally mounted on said actuating arm.

14. Apparatus for ultrasonically spot bonding foil fingers to a substrate comprising:
- a bonding machine frame,
- a work station on said frame,
- said substrate being mounted on said work station for supporting a plurality of said foil fingers juxtaposed bonding terminal pads on said device substrate,
- an ultrasonic transducer,
- a wedge bonding tool mounted in said transducer,
- a convex shaped working face on said wedge bonding tool,
- a transducer support bracket pivotally mounted on said frame,
- a first bearing shell mounted on said transducer support bracket,
- a transducer clamp mounted on said transducer,
- a second bearing shell connected to said transducer clamp,
- bearing means interposed between said first and second bearing shells for supporting said ultrasonic transducer for arcuate movement on said support bracket, and
- means for imparting an arcuate movement to said ultrasonic transducer to impart a pivotal rolling movement to said convex shape working face of said wedge bonding tool by pivoting said wedge bonding tool on its own working face.

* * * * *